United States Patent [19]

Shortall

[11] Patent Number: 4,988,117
[45] Date of Patent: Jan. 29, 1991

[54] RETRACTABLE SEAT ATTACHMENT FOR FOLDABLE CADDY CART

[75] Inventor: John F. Shortall, Dulin, Ireland

[73] Assignee: Designcraft International Ltd., Dublin, Ireland

[21] Appl. No.: 410,110

[22] Filed: Sep. 20, 1989

[51] Int. Cl.⁵ ............................................. B62B 1/10
[52] U.S. Cl. ........................ 280/646; 280/47.25; 280/DIG. 6; 297/217
[58] Field of Search .......... 280/DIG. 6, 47.19, 47.25, 280/646; 297/217

[56] References Cited

U.S. PATENT DOCUMENTS

| | | | |
|---|---|---|---|
| 2,673,589 | 3/1954 | Kunkel | 280/DIG. 6 |
| 2,777,707 | 1/1957 | Cloes | 280/DIG. 6 |
| 4,550,930 | 11/1985 | Proffit | 280/DIG. 6 |
| 4,749,228 | 6/1988 | Potter | 280/DIG. 6 |

FOREIGN PATENT DOCUMENTS 699360 11/1953 United Kingdom ......... 280/DIG. 6

Primary Examiner—David M. Mitchell
Attorney, Agent, or Firm—Schweitzer Cornman & Gross

[57] ABSTRACT

A seat attachment is provided for a folding caddy cart intended for carrying golf clubs. When the caddy cart is erected for use, the seat attachment forms an automatically retractable seat support mounted alongside the golf bag. When the caddy cart is stationary, a retractable support post extends downward to a position just above the ground. When the seat is used, the support post is depressed into contact with the ground and is supported thereby, so that the load is supported directly on the retractable post and is substantially isolated from the cart proper. When the cart is folded up for storage, the seat attachment is retracted and aligned with the spine of the cart, enabling the cart, with its attachment, to be compactly folded for transport in the trunk of a car, for example. The attachment is designed for use in conjunction with a wide variety of conventionally constructed foldable caddy carts.

7 Claims, 2 Drawing Sheets

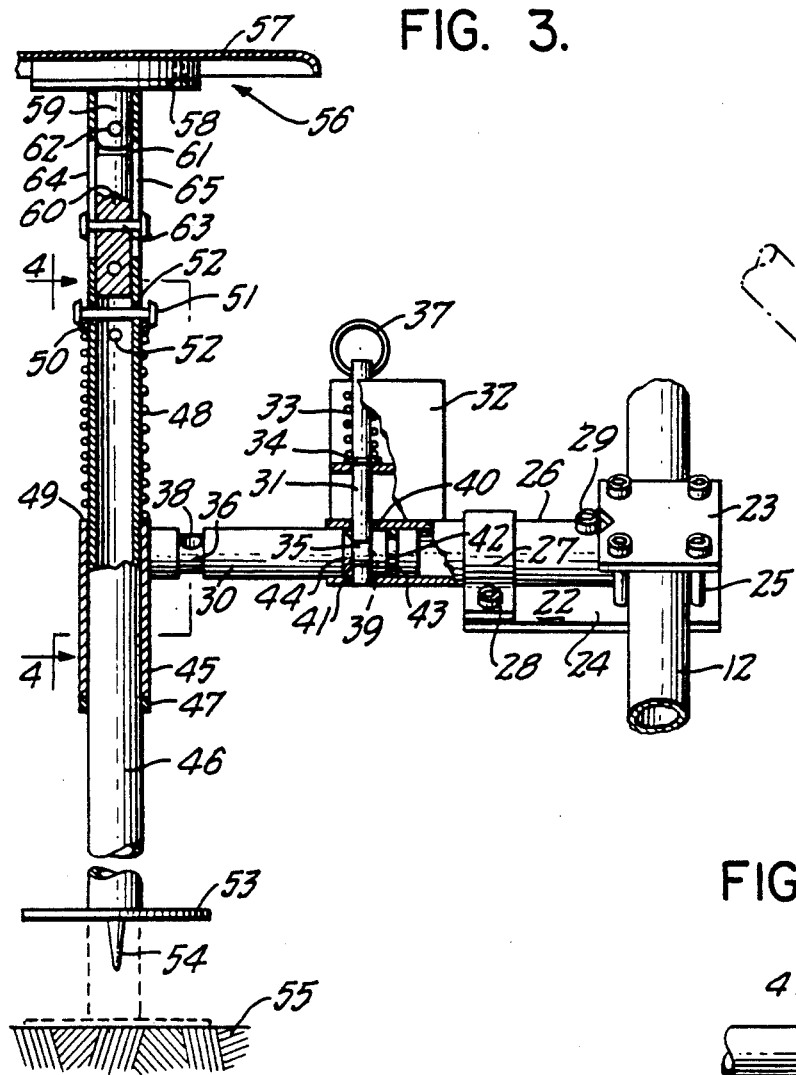
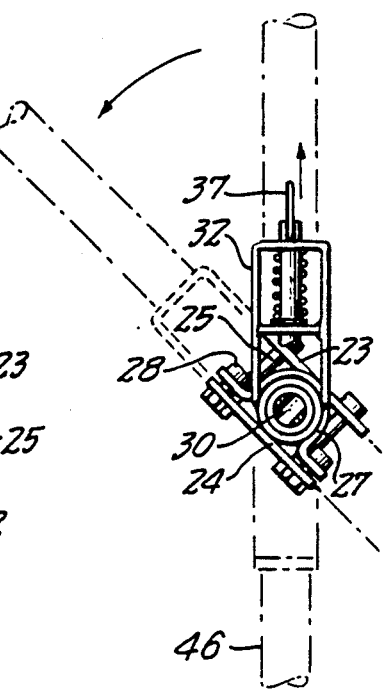
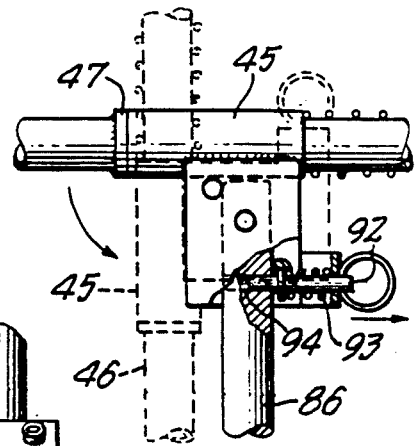
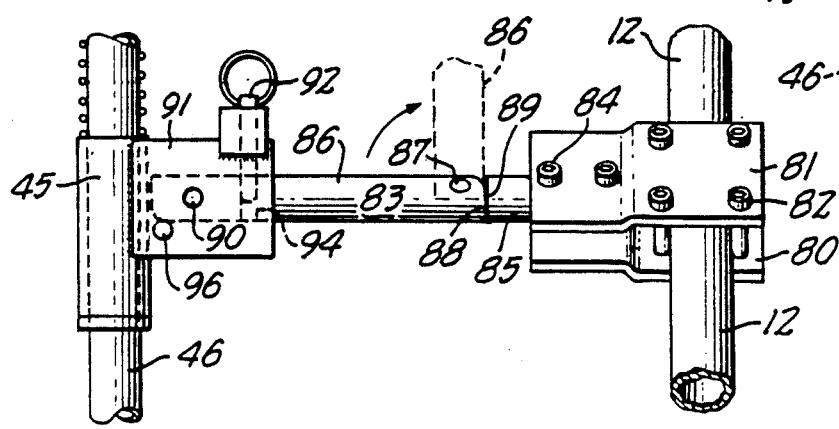

RETRACTABLE SEAT ATTACHMENT FOR FOLDABLE CADDY CART

BACKGROUND AND SUMMARY OF THE INVENTION

The present invention is directed to an attachment for foldable caddy carts commonly employed for carrying golf bags, to provide a resting seat for the player to use when the caddy cart is stationary.

Foldable golf bag carts are widely used by golfers to carry their clubs about the golf course. Typically, these carts, usually referred to as caddy carts, are formed with a frame including a main spine, having a pull handle at one end and a bag support at the other end, with provisions along the spine for supporting and securing a golf bag on top of and parallel to the spine. A wheel support structure is retractably mounted from an intermediate point along the spine. When the caddy cart is erected, it forms a tripod-like structure, with two spaced apart wheels and the lower extremity of the spine forming the three legs of the tripod. When the cart is at rest, it is supported in a stationary manner by these three supports. For transporting the bag, the cart is gripped by the handle, tipped up and pulled behind the golfer.

In accordance with the present invention, a novel caddy cart attachment is provided, which extends laterally from the spine of the cart and forms a seat upon which the golfer may rest when the cart is stationary.

Most of the popular styles of caddy carts are of relatively lightweight construction, in order to be more easily pulled about the course, and also to be more easily lifted into the trunk of a car, for example, for transport to and from the golf course. Accordingly, such carts are customarily designed with only sufficient structural strength to perform the required task of supporting the golfer's bag of clubs, but likely with not enough structural heft to support the weight of a heavy man, for example. Accordingly, one of the features of the invention resides in the design of the seat attachment so that the loads imposed thereon are substantially isolated from the structure of the caddy cart itself. To this end, the seat attachment in its operative position, comprises a vertically extending, retractable support carrying a seat pad at its upper end. The lower end of the support carries a bearing plate, adapted to engage and be supported by the ground. When a golfer sits upon the seat pad, the support is pressed downward, against the action of a return spring, until the bearing plate is supported on the ground below. When the golfer stands up, the support automatically raises a few inches off the ground, so that the cart can be pulled about even relatively rough terrain without interference from the seat attachment.

In accordance with another aspect of the invention, the new seat support attachment includes a novel and simplified retractable mounting, whereby when the caddy cart is retracted and folded up for storage or vehicle transport, for example, the seat attachment is secured in a retracted position, tight against the golf bag and generally parallel to the spine of the caddy cart. Likewise, the seat pad can be either removed or folded to lie alongside its support. The arrangement is such that, in the retracted condition of the seat attachment, it adds little if anything to the storage bulk of the caddy cart and bag.

For a better understanding of the above and other features and advantages of the invention, reference should be made to the following detailed description of preferred embodiments of the invention, and also to the accompanying drawings.

DESCRIPTION OF THE DRAWINGS

FIG. 3 is an enlarged, fragmentary elevational view of the seat attachment of the invention, with parts broken away to show details of construction.

FIG. 4 is a cross sectional view as taken generally on line 4-4 of FIG. 3, illustrating the arrangement for retractably mounting the seat support to the caddy cart frame.

FIG. 6 is a fragmentary illustration of a modified form of mechanism for retractably mounting the seat attachment to the caddy cart frame.

FIG. 7 is a view of the mechanism of FIG. 6 showing the seat attachment in its folded-up condition.

DESCRIPTION OF PREFERRED EMBODIMENTS

Figure 1:
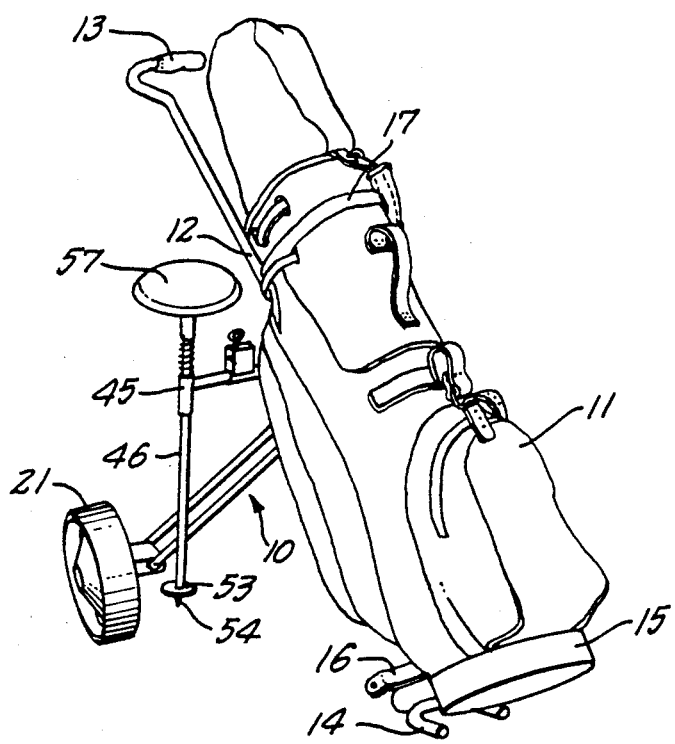
FIG. 1 is a perspective view of a caddy cart and golf bag, incorporating a seat attachment according to the invention, showing the seat attachment in position for use.

Referring now to the drawing, and initially to FIGS. 1-5 thereof, the reference numeral 10 designates generally a caddy cart of conventional construction designed to support a conventional golf bag 11 and its contents. Typically, the caddy cart 10, which itself forms no part of the present invention, comprises a frame including an elongated spine 12 having a pull handle 13 at its upper end and a foot support 14 at its lower end. The foot support serves in part as a ground support for the cart, and in part as a means for supporting the bottom 15 of the golf bag. Customarily, the spine 12 has, at one or more locations along the length of the golf bag 12, fixed lateral cradle supports 16, at least one of which may carry a strap 17 for securing the golf bag.

A foldable wheel structure is commonly provided on the caddy cart. On the illustrated cart, the wheel structure includes upper and lower wheel struts 18, 19 at each side, which are pivoted on the spine 12, and also at their outer ends to an axle member 20 supporting a wheel 21. The arrangement allows the caddy cart to be folded up, with the wheels 21 moved in tightly against the bag 11 and the pivoted struts 18, 19 extending more or less in the general direction of the spine 12. This enables the caddy cart to be configured compactly for storage and transportation, while at the same time allowing it to be unfolded or erected into a tripod configuration, comprising a pair of spaced wheels 21 and a foot bracket 14.

In accordance with the invention, a novel seat attachment is provided, which is designed to be mounted on the caddy cart spine 12 and is arranged, when the cart is erected, to form a seat upon which the golfer may rest when the cart is stationary.

As shown particularly in FIG. 3, the seat attachment of the invention includes a mounting bracket, generally designated by the reference numeral 22, comprising upper and lower clamping plates 23, 24, secured together by bolts 25 and adapted to be secured in tight-gripping relation to the tubular spine member 12 of the caddy cart. If desired, in order to accommodate spine members 12 of different diameters, the clamping plates 23, 24 may be provided with more than two sets of bolt-receiving holes, so that the clamping bolts may be separated by different widths.

The mounting bracket 22 further includes a tubular socket 26, which is fixed to the lower mounting plate 24 by means of a clamping strap 27 and bolt 28 and fixed against rotation by means of a bolt 29. Instead of the bolt 29, a second clamping strap 27 (not shown) may be employed, which will facilitate rotational adjustment of the tubular socket to accommodate different styles of caddy carts. Preferably, the strap(s) 27 and/or the tubular socket are provided with surface serrations (not shown) for secure gripping in any adjusted position.

Figure 2:
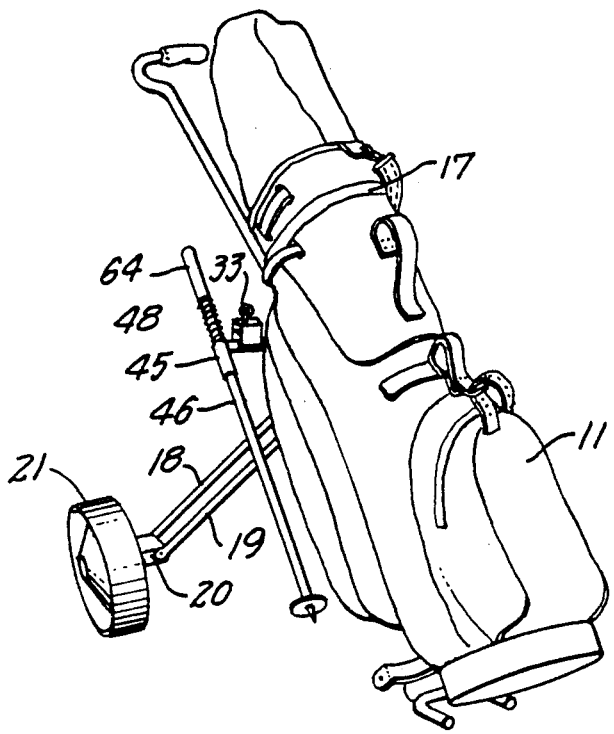
FIG. 2 is a perspective view, similar to FIG. 1, but illustrating the seat attachment in a folded and retracted position.

In the illustrated form of the invention, the tubular socket 26 extends horizontally outward from the tubular spine element 12 when the caddy cart is in its erected configuration, as shown in FIGS. 1 and 2. The mounting bracket 22 is designed to be substantially universally adaptable to any of a variety of conventional, commercially available caddy cart mechanisms, and is arranged to be adjustably mounted at an appropriate height and orientation along the spine 12, and then secured more or less permanently thereto by the bolts 25.

An extension rod 30 is telescopically received within the tubular socket 26 and is arranged to be fixed with respect to the tubular socket 26 in either an extended or retracted position. In the illustrated construction, the extension rod is secured by means of the retractable locking pin 31, mounted in a bracket 32. The pin is urged to a position projecting into and through the tubular socket 26 by means of a spring 33 bearing upon a washer 34 carried by the locking pin.

The extension rod 30 is provided adjacent its inner and outer ends with annular recesses 35, 36 serving as warning detents in combination with the locking pin 31. In order to move the extension 30 from an extended position to a retracted position, for example, the pin must first be gripped by its lifting ring 37 and withdrawn from the tubular socket 26. The extension rod 30 may then be pushed inwardly, after which the locking pin 31 may be released and allowed to ride along the outer surface of the extension rod until the recess 36 becomes aligned underneath the locking pin. At this point, the locking pin snaps into the recess 36 preventing axial movement of the extension rod in either direction.

In accordance with one aspect of the invention, the extension rod 30 is provided with means for fixing the rotational orientation of the extension rod. In the illustrated device, such orientation means is in the form of a bore 38 extending through the extension rod at the outer recess 36, and a similar bore 39 passing through the rod at the inner annular recess 35. Thus, as illustrated in FIG. 3, when the rod 30 is in its extended position, the locking pin 31 initially is received in the recess. However, upon rotation of the extension rod 30 to is desired angular orientation for the extended position, the locking pin aligns with the bore 39 and passes therethrough. In the locked position of the pin 31, it advantageously passes through bores 40, 41 on opposite sides of the tubular socket 26, as well as through the bore 39 of the extension rod, so that the rod is locked firmly in position, both rotationally and axially.

To advantage, the extension rod 30 is provided with an annular groove 42 receiving an O-ring 43. This provides a measure of frictional resistance to movement of the extension rod 30. In addition, the outer wall 44 of the recess 35 is disposed at an angle so that, when the extension rod is pulled outwardly toward its extended position, the locking pin 31 reliably drops into the recess, regardless of how hard the extension rod is pulled, in order to prevent its accidental complete withdrawal from the tubular socket 26.

At the outer extremity of the extension rod 30 there is mounted, by welding or other means, a tubular guide sleeve 45 extending at right angles thereto. Pursuant to the invention, the tubular sleeve 45 is so rotationally oriented with respect to the extension rod 30 that, when the extension is locked in its extended position, as shown in FIG. 3, the sleeve 45 is oriented to a vertical axis, when the caddy cart apparatus 10 is in an erected configuration and in an at rest position. This arrangement is illustrated in FIG. 1.

As shown in FIG. 3, an elongated, vertically extending tubular support 46 is slideably received within the tubular guide sleeve 45. A collar 47 is secured to the tubular support below the sleeve 45 and serves to limit upward movement of the tubular support relative to the sleeve. A compressed coil spring 48 bears against the upper end 49 of the guide sleeve and is adjustably fixed at its upper end by means of a collar 50 held against upward movement by a removable pin 51. The spring 48 normally urges the tubular support 46 upwardly to its limit position, with the collar 47 seated against the lower end of the tubular guide 45. Desirably, the tubular support may be provided with openings 52 at more than one location axially along the tubular support 46, for locating the retaining pin 51 at different levels and providing for different amounts of precompression in the spring 48.

At the lower extremity of the tubular support, there is rigidly mounted a bearing plate 53, preferably of circular configuration. Desirably, a tapered spike 54 projects downwardly from the bearing plate 53 a short distance (e.g., one inch). The arrangement is such that, when a vertically downward load is applied to the tubular support 46, the support descends until the bearing plate 53 engages the ground 55. The tapered spike 54 meanwhile penetrates the ground and stabilizes the tubular support 46 against lateral movement.

At the upper extremity of the retractable tubular support 46 is a seat assembly, generally designated by the numeral 56, which comprises a seat pad 57, typically of circular configuration, secured to a mounting plate 58. The mounting plate 58 has secured at its center a hinge assembly comprising first and second cylindrical rod sections 59, 60. At their adjacent ends, the rod sections are recessed, as at 61, to a depth of one half the diameter of the rods, and are connected by a hinge pin 62. The external diameter of the rod sections 59, 60 is substantially the same as the internal diameter of the tubular support 46. Accordingly, when the hinged rod sections 59, 60 are received inside the tubular support, the upper rod section 59 is locked firmly by the tubular support, and the seat pad 57 is accordingly locked in its operative position. By lifting the seat pad, however, the rod section 59 can be telescopically withdrawn from the upper end of the tubular support, after which the seat pad 57 may be pivoted at right angles to the tubular support 46, into a position suitable for storage of the caddy cart, as will be understood.

Figure 5:
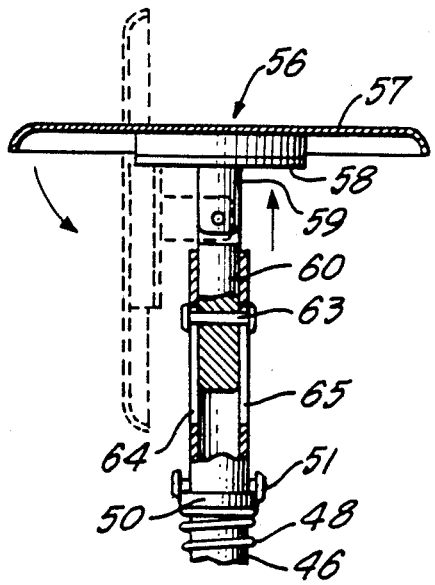
FIG. 5 is a fragmentary view of the seat pad mounting arrangement advantageously incorporated in the attachment of the invention, enabling the seat pad to be folded alongside for storage.

Desirably, the seat assembly 56 is retained in its assembled relation with the tubular support 46 by means of a pin 63, which passes through the lower hinged rod section 60 and is received in vertical slots 64, 65 provided in the upper portion of the tubular support. The arrangement is such that the seat assembly 56 may be lifted with respect to the tubular support sufficiently to accommodate folding of the seat pad 57, as shown in FIG. 5, while assuring that the seat assembly remains "captured" by the assembly. If desired, of course, the seat assembly may be entirely removed by disassembling and withdrawing the pin 63.

In the arrangement shown in FIG. 1 of the drawing, the caddy cart is erected and at rest. The seat attachment mechanism is shown in FIG. 1 is also being in the erected position. That is, the extension rod 30 has been moved to its extended position, as shown in FIG. 3, and rotationally locked so that the tubular support 46 is vertically aligned. The proportioning of the elements advantageously is such that, with both the caddy cart and the seat assembly erected, the seat pad 57 lies relatively close to the golf bag, and the vertical support 46 lies on the inside of the wheel 21, between the wheel and the bag. As reflected in FIG. 3, in the at-rest position of the seat assembly, the bearing plate 53 located slightly above the level of the terrain 53. This allows the cart to be pulled along over the golf course without concern for the lower end of the seat support engaging the ground and inhibiting movement. In this respect, the seat assembly is located at least slightly behind the axis of the wheels 21. Accordingly, when the caddy cart is either pulled or pushed over the ground, the forward tilting of the cart will tend to lift the lower extremely of the seat support even further above the level of the ground.

When the cart is at rest, as shown in FIG. 1, the user of the cart may simply sit down on the seat pad 57 when he or she desires to use the seat. The weight on the seat pad will cause the tubular support 46 to be depressed against the action of the spring 48 until the bearing plate 53 engages the surface of the ground. The entire weight of the seat pad is supported by the ground and is effectively isolated from the structure of the caddy cart. In this respect, while the compression force of the spring 48 is resisted by the caddy cart, this force is quite limited, as it is only required to lift the weight of the seat assembly 56 and tubular support 46.

When the golfer is ready to proceed, he or she may do so by merely standing up. Upon removal of the weight from the seat pad, the seat assembly is caused to be retracted by the spring 48 and the cart is immediately ready to be moved.

When the caddy cart is to be folded up and stowed away, the seat assembly is first folded in, into close proximity to the golf bag 11, to allow for retraction and folding of the wheels 21 and the struts 18, 19. To this end, the seat assembly is folded to the side, by first lifting the seat assembly and then tilting the seat pad 57 at 90°, as shown in FIG. 5. The locking pin 31 is then retracted by lifting on the ring 37 to withdraw the pin from the extension rod 30, allowing the extension rod to be pushed into the tubular socket. Once the retaining rod begins to move, the locking pin may be released, and it will automatically snap into the outer recess 36, when the extension rod reaches its fully retracted position.

Pursuant to the invention, when the locking pin 31 snaps into the outer recess 36, the tubular support 46 is rotated into general alignment with the caddy cart's spine 12. When such alignment is reached, the bore 38 becomes aligned with the locking pin 31, and the latter snaps into the bore and locks the assembly not only in its retracted position, but also rotationally oriented in general parallelism with the caddy cart's spine 12.

When the seat assembly is aligned in its retracted configuration, as shown in FIG. 2, the wheels and struts may be folded in a normal manner without interference from the seat attachment. It will be understood, with respect to FIG. 2, that the seat assembly 56 has been removed for convenience of illustration and need not be removed in the normal, folded configuration of the caddy cart and attachment.

Where desired, the seat pad 57 may be associated with or replaced by an ash tray or other device (not shown) for holding a golfer's cigarette or cigar. This is especially desireable at times when the grass is wet.

In the form of the invention illustrated in FIGS. 6 and 7, the seat attachment is mounted so that retraction and erecting of the seat mechanism is accomplished through folding operations, rather than the telescoping operations of the version of FIGS. 1-5. Thus, in the arrangement of FIGS. 6 and 7, clamping plates 80, 81, connected by bolts 82, serve to tightly secure the seat attachment to the spine member 12 of the caddy cart. A hinged mounting rod 83 is fixed to the mounting plates 80, 81 by means of bolts 84 passing through the plates and through one end of the mounting rod.

As indicated in FIG. 6, the mounting rod 83 comprises inner and outer portions 85, 86 joined by a hinge pin 87 to provide for pivoting action of the outer rod portion 86 in an upward direction through a pivot angle of approximately 90°. Opposed abutment surfaces 88, 89 on the respective rod sections serve to limit the downward pivoting portion of the outer rod section 86 to a substantially horizontal position, in which it is generally coaxial with the inner rod section 85. To best advantage, the axis of the pivot pin 87 is arranged at right angles to the axis of the caddy cart's spine 12. The arrangement is such that, when the outer mounting rod section 86 is pivoted to its upward limit position, shown in broken lines in FIG. 6, the outer mounting rod section is generally parallel to the spine member 12. When the outer rod section 86 is in its extended position, shown in full lines in FIG. 6, it is disposed generally horizontally to the ground and generally at right angles to the axis of the caddy cart spine 12.

Pivotally mounted on the outer end of the outer mounting rod 86, by means of a pivot pin 90, is a mounting bracket 91. The bracket 91 is in turn rigidly secured to a guide sleeve 45 slideably carrying a tubular support member 46. The guide sleeve 45, tubular support 46, and the mechanisms related thereto, are all as described with respect to the embodiment of FIGS. 1-5 and need not be redescribed here. When the mechanism of FIGS. 6 and 7 is in its erected or operative position, as shown in FIG. 6, the tubular support 46 is supported in a vertical orientation, with the seat available for use when the caddy cart is at rest.

The mechanism of FIG. 6 is secured in its extended or operative position by means of a locking pin 92, carried by the mounting bracket 91 and urged by a spring 93 into a bore 94 formed in the outer mounting rod section 86.

When mechanism of FIGS. 6 and 7 is unfolded and brought into its erected configuration shown in FIG. 6, pivoting action takes place at both of the pivot pins 87 and 90. The outer mounting rod section 86 pivots from an upright position to a horizontal position, extending outwardly from the caddy cart spine. The bracket 91, carrying the sleeve 45, tubular support 46 and the related seat mechanism, pivots clockwise about the axis of the pin 90 to a limit position in which a stop pin 96, fixed in the bracket 91, abuts against the lower surface of the outer mounting rod section 86. When this occurs, the tubular support 46 is substantially at right angles to the mounting rod and is substantially vertically disposed with respect to the ground. This is generally similar to the configuration shown in the illustration of FIG. 1. In this erected configuration, the locking pin 92 enters the bore 94 and locks the bracket 91 with respect to the outer mounting rod 86.

In order to fold up the mechanism of FIGS. 6-7, the locking pin 92 is released and the parts are folded in the opposite direction about the respective pivot pins 87, 90. In the fully folded-up configuration, the outer mounting rod section 86 extends upwardly, generally parallel to the spine 12, and the sleeve 45 and tubular support 46 lie close to, and extend generally parallel to, the mounting rod section 86 as indicated by the broken line showing of the sleeve 45 and tubular support 46 in FIG. 7 of the drawing.

It is to be noted in FIG. 6 that the axes of the respective pivot pins 87 and 90 are rotationally offset about 45°. Accordingly, when the sleeve 45 and tubular support 46 are folded in against the folded mounting rod, the tubular support lies partly below the mounting rod.

In any of its various forms, the apparatus of the invention provides a particularly advantageous device for incorporation with a conventional foldable caddy cart apparatus, providing an always-available seat for resting the golfer. The attachment device of the invention is designed to have a high degree of universality, enabling it to be utilized in conjunction with a wide variety of commercially available foldable caddy carts.

One significant aspect of the apparatus of the invention is the provision of arrangements for substantially isolating the caddy cart from the direct forces resulting from the weight of a seated player. The weight of the user is transferred directly by the tubular support 46 to the ground, and the structure of the caddy cart is isolated from all but minor stresses. Thus, the caddy cart does not have to be especially redesigned to withstand severe loads.

The apparatus of the invention is uniquely designed to be foldable closely against the caddy cart and bag, in the folded-up configuration of the cart. Thus, the seat attachment does not have to be removed from the caddy cart in order to configure it for storage or transportation.

When in normal use, the seat attachment is available instantly. All that is required of the user is to sit down on the seat pad in order to rest, and to stand up and leave when he or she is ready.

By locating the vertically retractable tubular support behind the axis of the caddy cart wheels, the extent of vertical reciprocation of the tubular support may be kept relatively small. This is because, when the cart is gripped for pulling, it is tipped forward at least to some degree. This serves to both raise the lower end of the retracted tubular support and also to cause it to point somewhat rearwardly. In this position and orientation, it is unlikely to engage even rough ground during normal movements of the caddy cart.

Notwithstanding its many advantageous features, the device of the invention can be manufactured and marketed at an acceptable cost level. Its construction is such that it can be marketed either as an after-market accessory, or as an integral part of the original equipment.

It should be understood, of course, that the specific forms of the invention herein illustrated and described are intended to be representative only, as certain changes may be made therein without departing from the clear teachings of the disclosure. Accordingly, reference should be made to the following appended claims in determining the full scope of the invention.

I claim:

1. A seat attachment for a caddy cart or the like of the type having a pair of spaced-apart wheels, an inclined frame member supported by said wheels and having a portion rearward of said wheels engageable with the ground when the cart is stationary and a portion forward of said wheels engageable by the user to pull the cart forward, which comprises,
   (a) a mounting member extending laterally outward from said frame member in a location behind the axis of said wheels when said cart is in a resting position,
   (b) a generally vertically disposed support member carried at the outer end of said mounting member and movable vertically with respect to said frame member,
   (c) resilient means normally urging said support member upwardly whereby its lower end is positioned slightly above the surface upon which said cart is resting,
   (d) a seat pad supported by said vertical support member,
   (e) said vertically disposed support member being movable relative to said cart and into supported contact with said surface when the weight of a person is supported on said seat pad,
   (f) said mounting means including means for retracting said vertical support member to a position close to and generally in alignment with said frame member.
   (g) said mounting means comprising means accommodating controlled displacement of said vertical support member toward said frame member and controlled rotational re-orientation of said vertical support member into general alignment with said frame member to enable retraction of said vertical support member.

2. A seat attachment for a caddy cart or the like of the type having a pair of spaced-apart wheels, an inclined frame member supported by said wheels and having a portion rearward of said wheels engageable with the ground when the cart is stationary and a portion forward of said wheels engageable by the user to pull the cart forward, which comprises,
   (a) mounting means for securing said attachment to said frame member,
   (b) said mounting means including means extending laterally from said frame member.
   (c) a guide member carried by said mounting means and spaced laterally of said frame member,
   (d) a generally vertical support member slidably received in said guide member for limited movement in a generally vertical direction, (e) spring means for urging said vertical support member upwardly to a predetermined limit upper position, (f) the lower end of said vertical support member, when said member is in its upper limit position, being a short distance above the support surface on which said cart is resting, (g) a seat pad supported at the upper end of said vertical support member, (h) said vertical support member being displaceable downwardly against the resistance of said spring means when load is applied to said seat pad, and (i) a bearing member carried at the lower end of said vertical support member and engageable with said support surface when said support member is displaced downwardly under load applied to said seat pad, (j) said mounting means comprising a tubular socket fixed to said frame member and extending laterally outward therefrom, and an extension rod slidably received in said tubular socket, (k) a locking pin carried by said tubular socket and engageable with said extension rod, said extension rod having inner and outer recesses therein for receiving said locking pin to lock said extension rod alternately in retracted or extended position in said tubular socket.

3. Apparatus according to claim 2, further characterized by (a) said recesses comprising annular recesses for receiving said locking pin in any orientation of said extension rod, (b) said extension rod having transverse bores therein in the region of said annular recesses for receiving said locking pin and locking said extension rod in predetermined rotational orientations, (c) said vertical support member being vertically oriented when said extension rod is locked in its extended position and being angularly oriented to be generally aligned with said frame member when said extension rod is locked in its retracted position.

4. A seat attachment for a caddy cart or the like of the type having a pair of spaced-apart wheels, an inclined frame member supported by said wheels and having a portion rearward of said wheels engageable with the ground when the cart is stationary and a portion forward of said wheels engageable by the user to pull the cart forward, which comprises, (a) mounting means for securing said attachment to said frame member, (b) said mounting means including means extending laterally from said frame member (c) a guide member carried by said mounting means and spaced laterally of said frame member, (d) a generally vertical support member slidably received in said guide member for limited movement in a generally vertical direction, (e) spring means for urging said vertical support member upwardly to a predetermined limit upper position, (f) the lower end of said vertical support member, when said member is in its upper limit position, being a short distance above the support surface on which said cart is resting, (g) a seat pad supported at the upper end of said vertical support member, (h) said vertical support member being displaceable downwardly against the resistance of said spring means when load is applied to said seat pad, and (i) a bearing member carried at the lower end of said vertical support member and engageable with said support surface when said support member is displaced downwardly under load applied to said seat pad, (j) said vertical support member having a tubular upper portion, (k) seat pad mounting means being provided for mounting said seat pad and comprising rod-like means telescopically received in said tubular upper portion, (l) said rod-like means comprising upper and lower sections pivotally joined at their adjacent ends, (m) said seat pad being mounted at the upper end of said upper rod-like section whereby, upon partial telescopic withdrawal of said rod-like means from said tubular upper portion, the upper section of said rod like means and said seat pad may be folded at right angles to their normal positions.

5. A seat attachment for a caddy cart of the like of the type having a pair of spaced-apart wheels, an inclined frame member supported by said wheels and having a portion rearward of said wheels engageable with the ground when the cart is stationary and a portion forward of said wheels engageable by the user to pull the cart forward, which comprises, (a) a mounting member extending laterally outward from said frame member in a location behind the axis of said wheels when said cart is in a resting position, (b) a generally vertically disposed support member carried at the outer end of said mounting member and movable vertically with respect to said frame member, (c) resilient means normally urging said support member upwardly whereby its lower end is positioned slightly above the surface upon which said cart is resting, (d) a seat pad supported by said vertical support member, (e) said vertically disposed support member being movable relative to said cart and into supported contact with said surface when the weight of a person is supported on said seat pad, (f) said mounting means including means for retracting said vertical support member to a position close to and generally in alignment with said frame member, (g) said mounting means comprising a foldable extension rod secured at one end to said frame member and foldable intermediate its ends, (h) said extension rod comprising inner and outer sections pivotally connected for folding movement about an axis generally at right angles to the axis of said frame member, whereby upward pivoting movement of said outer section aligns said section generally parallel with said frame member, (i) said vertical support member being pivotally connected to the end of said outer rod section enabling said support member to be folded into generally parallel relation to said frame member in the folded-up configuration of said cart.

6. Apparatus according to claim 5, further characterized by, (a) said mounting means comprising a laterally extending tubular socket mounted on said frame member,
(b) an extension member telescopically and rotatably received in said tubular socket,
(c) means to lock said extension member in predetermined retracted and extended positions and in predetermined rotational orientations in said tubular socket.

7. A seat attachment for a caddy cart or the like of the type having a pair of spaced-apart wheels, an inclined frame member supported by said wheels and having a portion rearward of said wheels engageable with the ground when the cart is stationary and a portion forward of said wheels engageable by the user to pull the cart forward, which comprises,
(a) a mounting member extending laterally outward from said frame member in a location behind the axis of said wheels when said cart is in a resting position,
(b) a generally vertically disposed support member carried at the outer end of said mounting member and movable vertically with respect to said frame member,
(c) resilient means normally urging said support member upwardly whereby its lower end is positioned slightly above the surface upon which said cart is resting,
(d) a seat pad supported by said vertical support member,
(e) said vertically disposed support member being movable relative to said cart and into supported contact with said surface when the weight of a person is supported on said seat pad,
(f) said mounting means including means for retracting said vertical support member to a position close to and generally in alignment with said frame member,
(g) said support member having a tubular upper end portion,
(h) a seat pad support assembly comprising upper and lower rod sections telescopically received within said tubular upper portion, and
(i) said upper and lower rod sections being pivotally connected whereby, upon partial telescopic withdrawal of said rod sections from said tubular upper portion, said seat pad and said upper rod section may be pivoted to a fold-up configuration relative to said support member.

* * * * *